United States Patent
Scarth et al.

(10) Patent No.: US 12,172,692 B2
(45) Date of Patent: Dec. 24, 2024

(54) INDUSTRIAL CART COMPRISING A MOTHER OR PRIMARY CART AND A SECONDARY OR DAUGHTER CART

(71) Applicant: SailRail Automated Systems Inc., Markham (CA)

(72) Inventors: Ian Scarth, King City (CA); Danny Pitcher, Stirling (CA); Shawn Dawson, Bowmanville (CA)

(73) Assignee: SailRail Automated Systems Inc., Markham (CA)

(*) Notice: Subject to any disclaimer, the term of this patent is extended or adjusted under 35 U.S.C. 154(b) by 0 days.

(21) Appl. No.: 17/652,403

(22) Filed: Feb. 24, 2022

(65) Prior Publication Data
US 2022/0177020 A1 Jun. 9, 2022

Related U.S. Application Data

(62) Division of application No. 16/024,274, filed on Jun. 29, 2018, now Pat. No. 11,285,984.

(51) Int. Cl.
*B62B 3/14* (2006.01)
*B62B 5/00* (2006.01)

(52) U.S. Cl.
CPC ............ *B62B 3/1476* (2013.01); *B62B 5/00* (2013.01)

(58) Field of Classification Search
CPC ............ B62B 2207/00; B62B 2207/02; B62B 2207/04; B62B 3/1404; B62B 3/1476; B62B 2202/90; B62D 53/005
See application file for complete search history.

(56) References Cited

U.S. PATENT DOCUMENTS

| | | | | |
|---|---|---|---|---|
| 4,515,518 A | * | 5/1985 | Gilbert | B60P 1/6445 280/43.23 |
| 4,687,215 A | * | 8/1987 | Brendgord | B62B 3/10 211/126.1 |
| 6,866,463 B2 | * | 3/2005 | Riordan | B62B 3/04 280/79.3 |
| 8,302,975 B2 | * | 11/2012 | Hergeth | B62D 53/005 280/47.19 |
| 9,078,967 B2 | * | 7/2015 | Oerter | A61M 1/1656 |
| 9,211,900 B2 | * | 12/2015 | Knepp | B62B 3/08 |
| 9,227,645 B2 | * | 1/2016 | Franco | B62B 5/087 |
| 9,290,214 B2 | * | 3/2016 | Badura | B62D 53/00 |
| 9,676,314 B2 | * | 6/2017 | Neubauer | B60P 1/025 |
| 9,738,299 B2 | * | 8/2017 | Ard | B62B 3/02 |
| 9,738,465 B2 | * | 8/2017 | Berghammer | B60P 1/02 |
| 9,862,435 B2 | * | 1/2018 | Scarth | B62D 53/04 |
| 10,093,334 B1 | * | 10/2018 | Brown | B62B 3/18 |
| 10,377,434 B2 | * | 8/2019 | Berghammer | B62D 53/005 |

(Continued)

FOREIGN PATENT DOCUMENTS

DE 102010043207 A1 * 3/2012 ........... B62D 53/005

*Primary Examiner* — Katy M Ebner
(74) *Attorney, Agent, or Firm* — Workman Nydegger

(57) ABSTRACT

In one example, a mother cart is provided that is suitable for transporting a daughter cart. The mother cart includes a base frame having a group of wheels configured to allow the mother cart to be moved. The base frame, in turn, includes a loading bay for receiving the daughter cart, and a support surface for supporting the daughter cart. Finally, the base frame includes a primary restraint mechanism for engaging and securing the daughter cart in the loading bay.

10 Claims, 17 Drawing Sheets

(56) References Cited

U.S. PATENT DOCUMENTS 10,391,625 B2 * 8/2019 Gang ...................... B25H 1/12
2019/0225285 A1 * 7/2019 Packeiser ................ F41H 7/005
2019/0308651 A1 * 10/2019 Knepp .................. B62B 5/0083

* cited by examiner

INDUSTRIAL CART COMPRISING A MOTHER OR PRIMARY CART AND A SECONDARY OR DAUGHTER CART

FIELD OF THE INVENTION

The present invention relates to industrial cart systems, and more particularly, to industrial cart comprising a mother or primary cart and a secondary or daughter cart.

BACKGROUND OF THE INVENTION

In the art, forklifts have traditionally been used to deliver or move materials, for example, palletized loads, or loads contained in bins, in a factory or other industrial plant. For a variety of reasons, including safety concerns, plants have been moving to being "forklift free" or substantially forklift free.

The movement of materials or parts and/or material containers in a plant is typically done using automated guided vehicles ("AGV") or a man-on-board system or a combination of both. In a typical man-on-board system, the material or components are moved in plant using a train of carts, and a human operator unloads the carts and removes empty carts. Because a human operator is involved, there will be limits on the size and/or weight of loads and/or cart configurations that can be handled, for example, based on a safety and/or physical handling considerations.

Accordingly, there remains a need for improvements in the art.

BRIEF SUMMARY OF THE INVENTION

The present invention is directed to an industrial cart system comprising a mother and daughter configuration. According to an exemplary implementation or application one or more mother/daughter cart units are coupled together and moved through an industrial plant by a tractor or other drive mechanism. The daughter cart is disengageable from the associated mother cart and is offloaded or disengaged, for example, to deliver parts, components or other materials, at a work station or assembly station in the plant. The empty daughter cart is loaded back onto the mother cart and moved.

According to another exemplary implementation or embodiment, a method or process is provided comprising coupling one or more mother/daughter cart units together and moving the coupled mother/daughter cart units through an industrial plant utilizing a tractor, or a drive mechanism integrated with the industrial plant, for delivery of parts, components or other materials, or removal or transfer of parts, components or other materials, at or from one or more work stations or assembly stations in the industrial plant.

According to one aspect, the present invention comprises a mother cart suitable for transporting a daughter cart, the mother cart comprises: a base frame, the base frame includes a plurality of wheels configured to allow the mother cart to be moved; the base frame includes a loading bay for receiving the daughter cart, and a support surface for supporting the daughter cart; and the base frame has a primary restraint mechanism for engaging and securing the daughter cart in the loading bay.

According to another aspect, the present invention comprises a mother cart suitable for transporting a daughter cart, the mother cart comprises a base frame and the base frame comprises a substantially C-shape structure with an open side, and the open side defining a loading bay for receiving the daughter cart; the base frame including a support surface for supporting the daughter cart; the base frame having a primary restraint mechanism for engaging and securing the daughter cart in said loading bay; and the base frame further including one or more anti-splay receptacles, the anti-splay receptacles being configured for engaging a corresponding anti-splay member on the daughter cart so as to reduce splaying of the open side of the C-shape structure.

According to another aspect, the present invention comprises an industrial parts delivery system comprising two or more mother carts coupled together to form a train of carts, and one of said mother carts being configured to be coupled to a tractor; the mother cart comprises, a base frame and the base frame comprising a substantially C-shape structure with an open side, and the open side defining a loading bay for receiving the daughter cart; the base frame including a support surface for supporting the daughter cart; the base frame having a primary restraint mechanism for engaging and securing the daughter cart in the loading bay; and the base frame further including one or more anti-splay receptacles, the anti-splay receptacles being configured for receiving a corresponding anti-splay member on the daughter cart so as to reduce splaying of the open side of the C-shape structure.

Other aspects and features of the present invention will become apparent to those ordinarily skilled in the art upon review of the following description of embodiments of the invention and/or the accompanying figures.

BRIEF DESCRIPTION OF THE DRAWINGS

Reference will now be made to the accompanying drawings which show, by way of example, embodiments of the present invention, and in which.

In the drawings, like reference numerals indicated like components or elements.

DETAILED DESCRIPTION OF THE EMBODIMENTS OF THE INVENTION

Figure 1A:
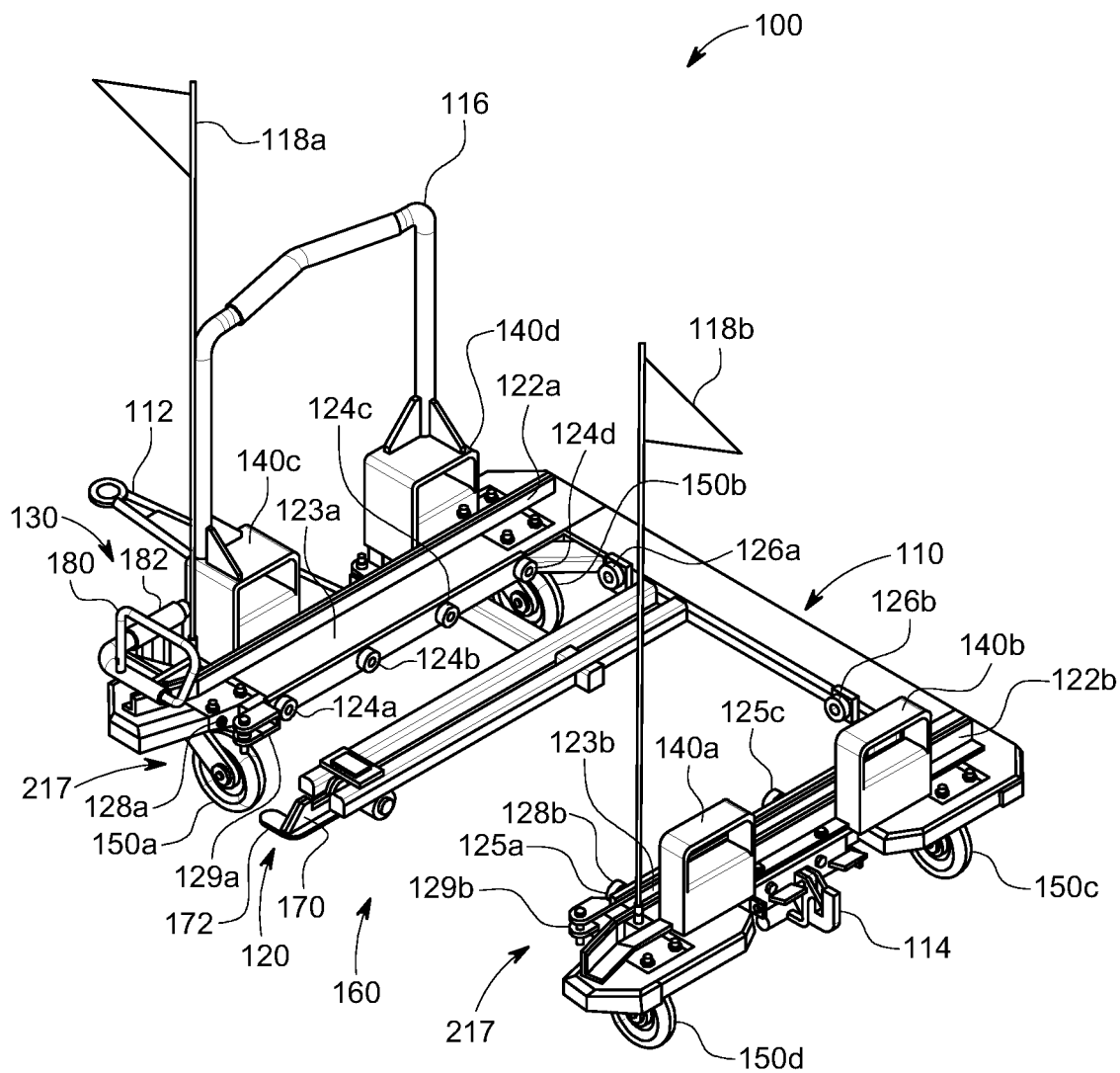
FIG. 1A shows in diagrammatic form a mother or primary cart according to an embodiment of the present invention.
Figure 1B:
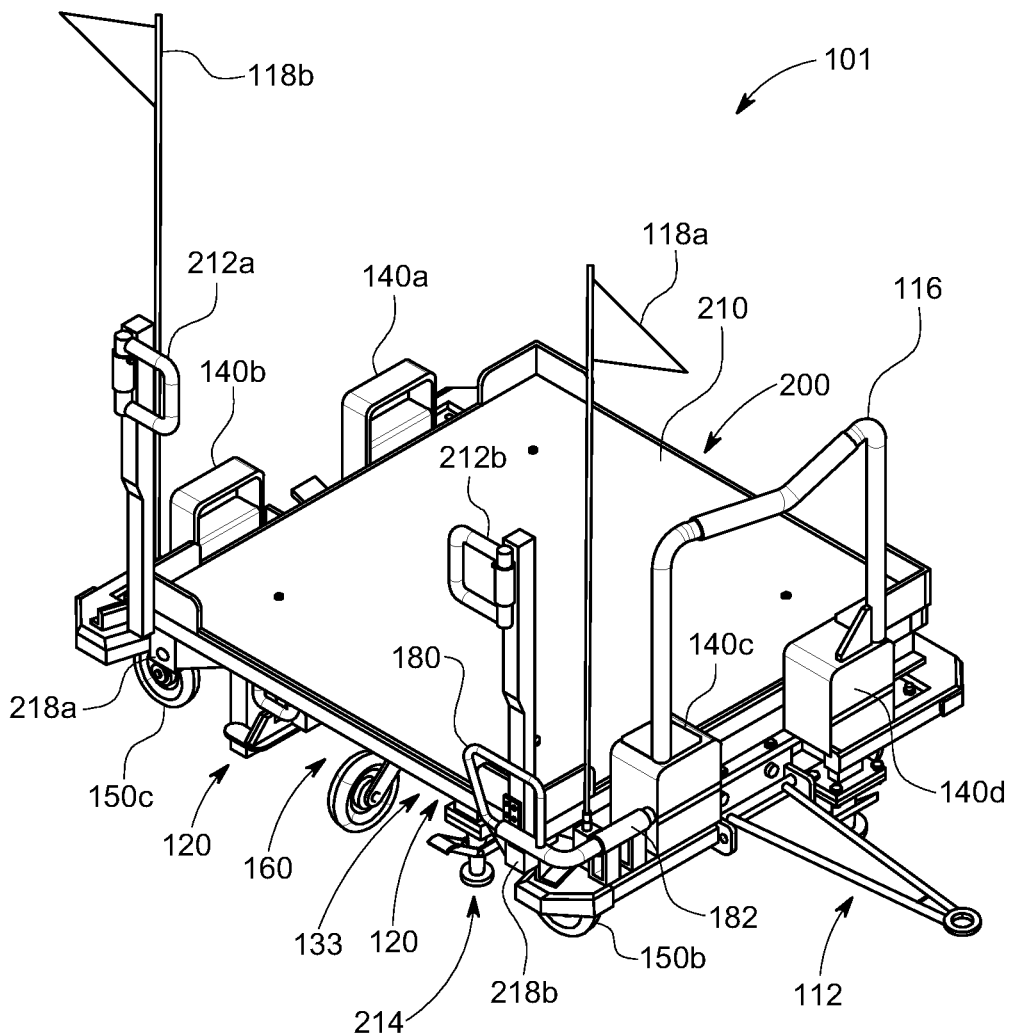
FIG. 1B shows a mother cart according to another embodiment of the present invention shown with a daughter or secondary cart in the engaged or loaded position or configuration.

Reference is first made to FIG. 1A, which shows a mother or primary cart according to an embodiment of the present invention and indicated generally by reference 100. The mother or primary cart 100 is configured to carry or transport a daughter or secondary cart indicated generally by reference 200 as shown in FIG. 1B. The mother cart 100 in FIG. 1A is configured for "left-hand" or left-side loading, and the mother cart indicated by reference 101 in FIG. 18 is configured for "right-hand" or right-side loading, as will be described in more detail below. The daughter cart 200 may take various forms, some of which are described in more detail below, and is generally configured to carry a load, for example, automotive components or parts in a bin or other container.

Figure 4:
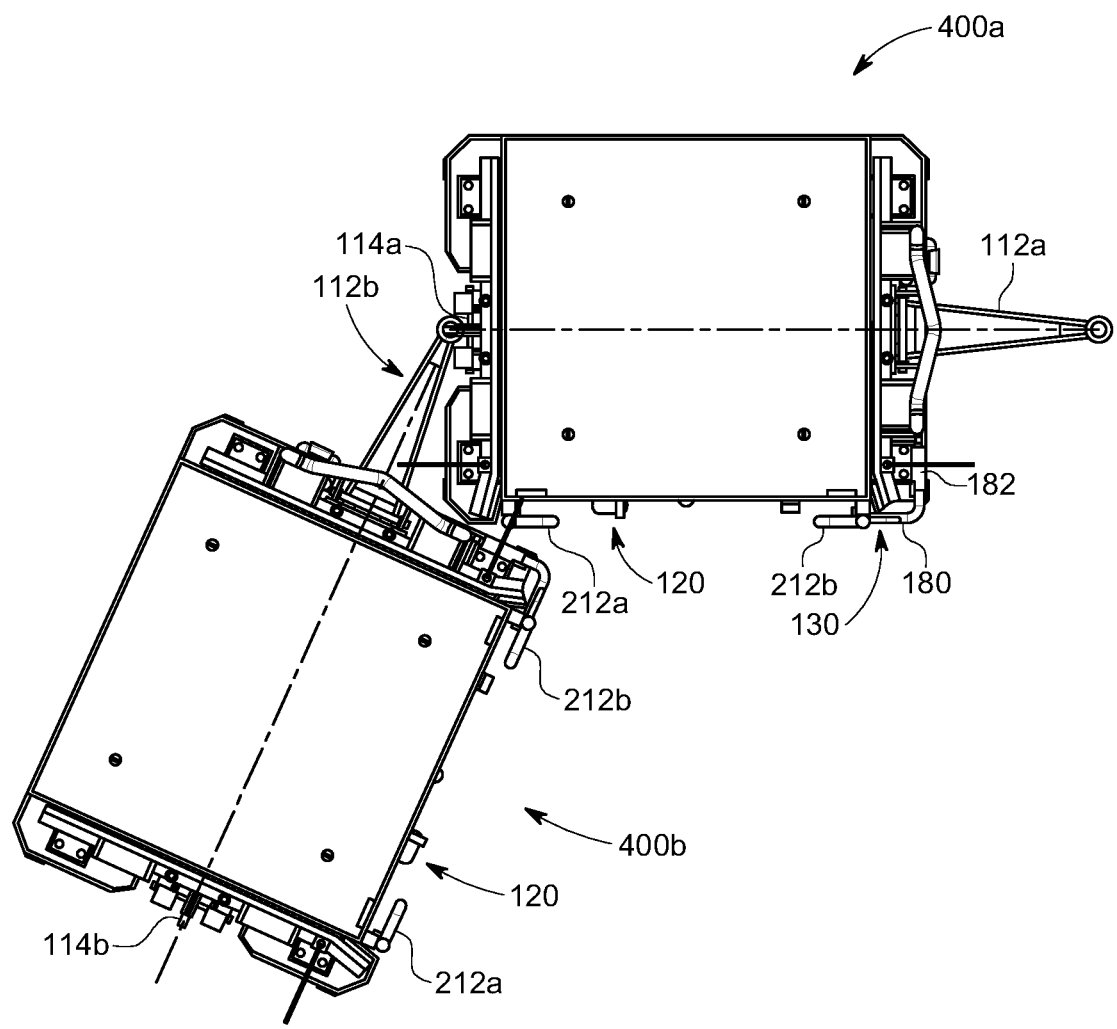
FIG. 4 shows a top view of a mother and daughter coupled in a train arrangement and depicted in a turning layout.

As shown in FIG. 1A, the mother or primary cart 100 comprises a base frame 110. The base frame 110 includes a tow bar 112 and a hitch 114, which are configured to couple to respective front or rear mother carts to form a train, for example, as depicted in FIG. 4 and indicated by references 400a and 400b. The mother cart 100 includes a push handle 116 which is connected to the front of the base frame 110, and allows an operator to manually move or position the cart 100. The mother cart 100 may also include one or more whip flags 118, indicated individually by references 118a and 118b. As shown, the base frame 110 is configured with a primary restraint mechanism 120 and a secondary restraint mechanism 130. The primary 120 and secondary 130 restraint mechanisms are configured to further secure the daughter cart 200 to the mother cart 100, as described in more detail below. According to an embodiment, the mother cart 100 is configured with fork-lift pockets 140. Two fork lift pockets 140a and 140b are connected or affixed to the rear section of the base frame 110, and two corresponding (i.e. aligned with respective fork lift pockets 140a and 140b) fork lift pockets 140c and 140d are connected or affixed to the front section of the base frame 110 as shown in FIG. 1A. The mother cart 100 can be lifted or moved by inserting a fork into each pair of respective forklift pockets 140a, 140c and 140b, 140d. According to an embodiment, the mother cart is configured with four castors or wheels 150, indicated individually by references 150a, 150b, 150c and 150d.

As also shown in FIG. 1A, the mother cart 100 is configured with a daughter cart loading bay or slot, indicated generally by reference 160. The loading bay or slot 160 is configured to receive and support the daughter cart 200 on the base frame 110 of the mother cart 100. According to an embodiment, the base frame 110 comprises a generally C-Frame configuration with the loading bay or slot 160 in the open side of the base frame 110. According to an exemplary implementation, the mother cart 100 is configured for left hand or left side loading of the daughter cart as shown in FIG. 1A. The mother cart can also be configured for right hand or right side loading of the daughter cart 200 as shown in FIG. 1B and indicated generally by reference 101.

Figure 2A:
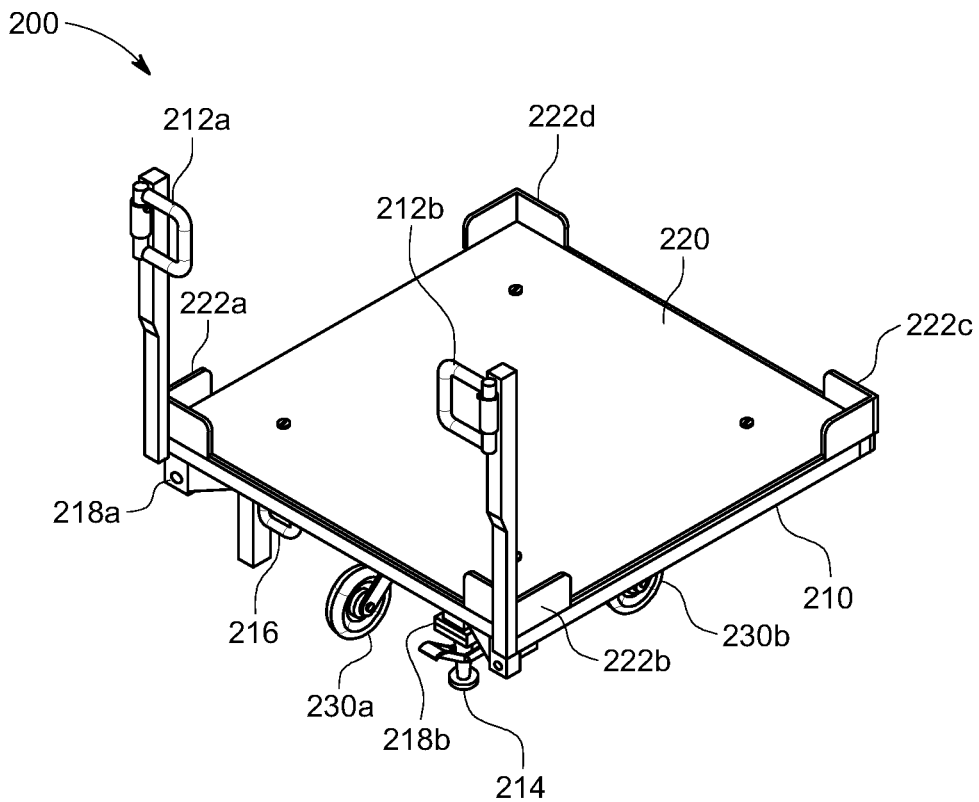
FIG. 2A shows a daughter cart according to an embodiment of the present invention.
Figure 2B:
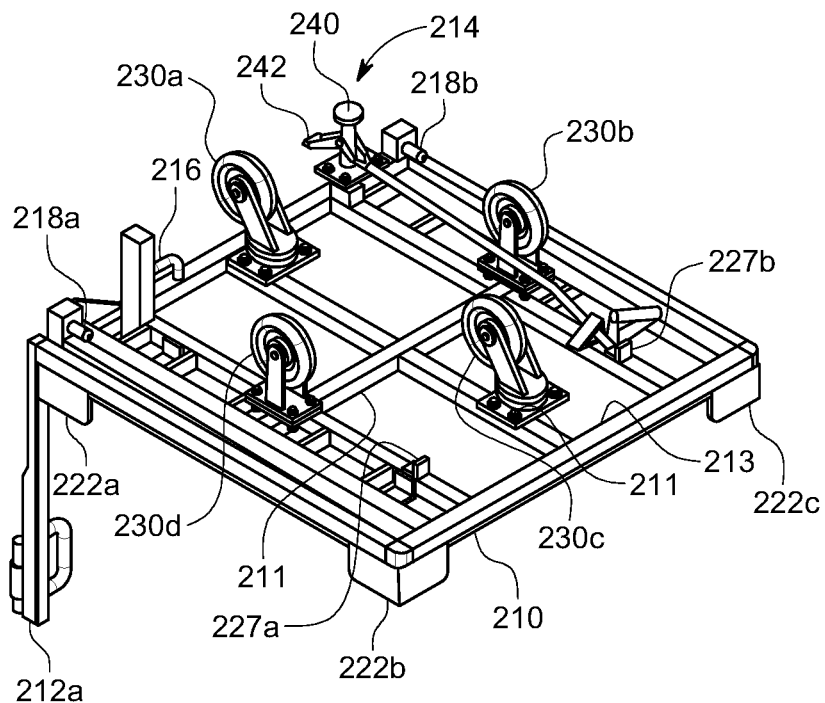
FIG. 2B shows a bottom view of the daughter cart of FIG. 2A according to an embodiment of the invention.

Reference is next made to FIGS. 2A and 2B, which shows an embodiment of the daughter cart 200 according to an embodiment of the present invention. The daughter cart 200 comprises a base frame indicated generally by reference 210. The base frame 210 includes a deck or support surface 220. The deck 220 may comprise a flat surface as shown for loading and transporting a bin or other container on the daughter cart 200. According to an exemplary implementation, the deck 220 can include corner brackets 222, indicated individually by references 222a, 222b, 222c and 222d, for further securing a bin or other container on the deck 220. As shown, the daughter cart 200 includes one or more push handles 212, indicated individually by references 212a and 212b, in FIGS. 2A and 2C. The push handles 212a, 212b are connected or attached to the base frame 210 of the daughter cart 200 and allow an operator to move the daughter cart 200 on/off the mother cart 200 or otherwise maneuver the cart 200 in a plant or application. As shown in FIG. 2B, the daughter cart 200 is configured with four wheels or castors 230, indicated individually by references 230a, 230b, 230c and 230d. The wheels 230 are connected or attached to the base frame 210 of the daughter cart 200, which can comprise one or more cross-members 211 connected to the outer or perimeter frame 213 of the base frame 210. According to an exemplary implementation, the wheels or castors 230 are configured in a "diamond" arrangement, which provides a tight turning radius for turning and maneuvering the daughter cart 200.

Figure 2C:
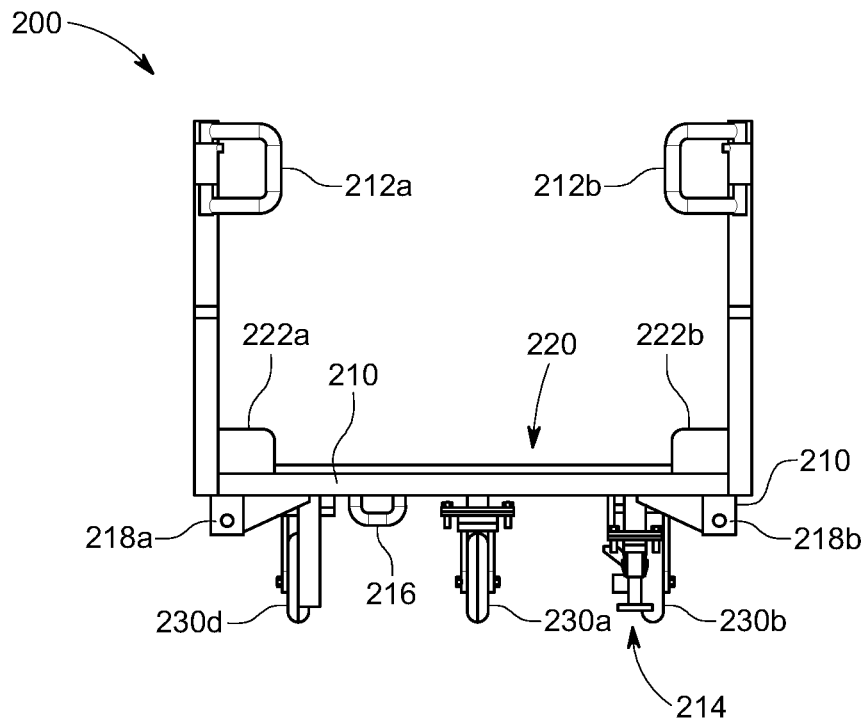
FIG. 2C shows a front view of the daughter cart of FIG. 2A.

As shown in FIGS. 2A and 2C, the daughter cart 200 may also include a daughter cart floor lock indicated by reference 214. The cart lock 214 is affixed or connected to the daughter cart base frame 210 and is configured to secure the daughter cart 200 against the floor and prevent the mother/daughter cart from rolling. According to an exemplary implementation, the cart lock 214 comprises a vertical stop 240 that is moved down with an actuator 242, for example, a footactivated actuator, to secure the cart 200 against the plant floor or work surface, and moved up with actuator 242 to release the stop 240.

Referring still to FIGS. 2A and 2C, the base frame 210 for the daughter cart 200 also includes a locking hoop or ring indicated by reference 216. The hoop 216 is engaged by the primary restraint mechanism 120 (FIGS. 1A and 1B) on the mother cart 100 to secure the daughter cart 200 when loaded on the mother cart 100, as will be described in more detail below.

Figure 8:
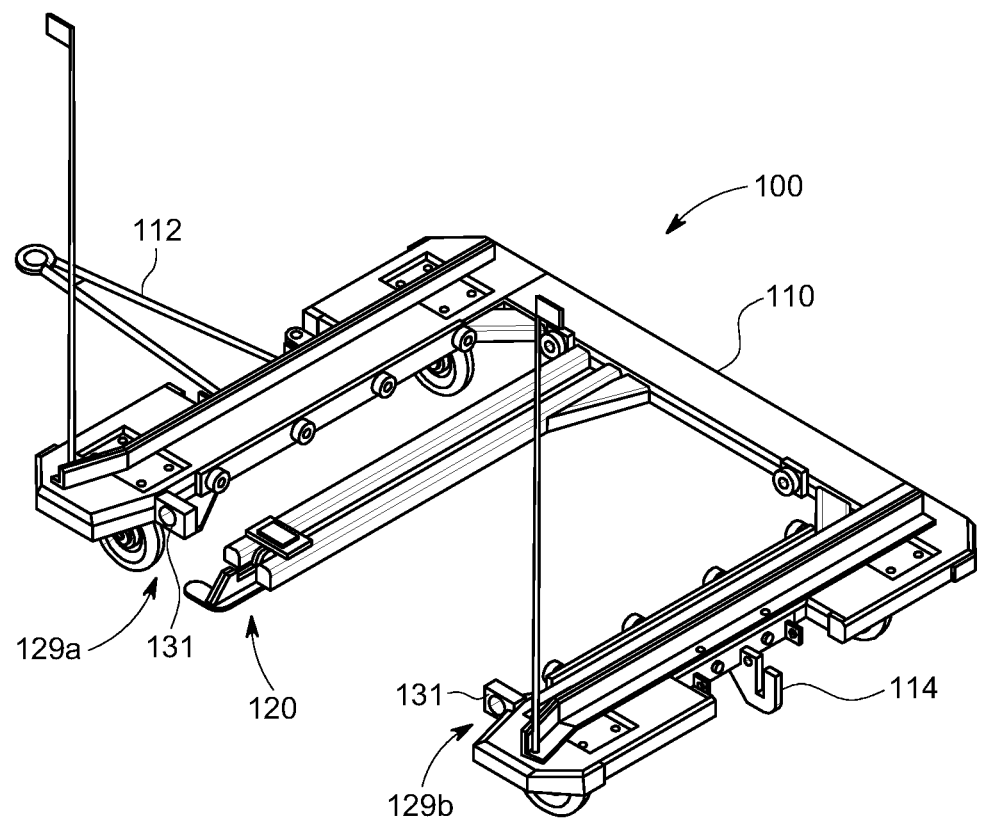
FIG. 8 shows the mother cart of FIG. 1A with an anti-splay mechanism according to another embodiment of the invention.

As also shown in FIGS. 2A and 2B, the daughter cart 200 includes an anti-splay mechanism 217. According to one embodiment, the anti-splay mechanism 217 comprises anti-splay pins or members 218, indicated individually by references 218a and 218b, and corresponding anti-splay receptacles or slots 128, indicated individually by references 128a and 128b. The anti-splay pins 218 are attached or formed in the base frame 210 and configured to engage the respective anti-splay slots or receptacles 128 in the mother cart 100 as shown in FIG. 1A. The anti-splay pins 218 are configured to engage the anti-splay slots 128 and provide a structural connection when the daughter cart 200 is mounted in the mother cart 100, which functions to prevent the open end (i.e. C-Frame configuration) of the loading bay or slot 160 from splaying or opening up and stressing the structure of the mother cart base frame 110. As shown in FIG. 1A, the anti-splay slots 128a, 128b may include respective rollers 129a and 129b, which are configured to facilitate guiding and engagement/disengagement of the anti-splay pins 218a, 218b, when the daughter cart 200 is mounted/unmounted from the mother cart 100. According to another embodiment, the base frame 110 of the mother cart 100 is configured with anti-splay receiver holes 129, indicated individually by references 129a and 129b, respectively, as shown in FIG. 8. The anti-splay receiver holes 129 are configured to receive the anti-splay pins 218. According to an exemplary implementation, the receiver holes 129 are chamfered or beveled as indicated by reference 131 to facilitate the guiding and insertion of the anti-splay pins 128 as the daughter cart 200 is loaded on the mother cart 100.

As shown in FIG. 1A, the base frame 110 of the mother cart 100 includes slide or guides plates 122, indicated individually by references 122a and 122b. The slide plates 122 help guide the daughter cart 200 into position onto adjacent support surfaces or ledges 123a and 123b on the base frame 110 when the daughter cart 200 is loaded onto the mother cart 100. The base frame 110 may also include a front roller track comprising rollers 124, indicated individually by references 124a, 124b, 124c in FIG. 1A, and a rear roller track comprising rollers 125, indicated individually by references 125a, 125b. The rollers 124, 125 are configured to facilitate movement of the daughter cart 200 on and off the mother cart 100. According to another aspect, the rollers 124, 125 can be mounted higher (or lower) on the base frame 110 to increase (or decrease) the ground clearance between of the daughter cart 200 when mounted on the mother cart 100. According to another aspect, the base frame 110 on the mother cart 100 may also include one or more backstops 126, indicated by references 126a and 126b in FIG. 1A. The base frame 210 of the daughter cart 200 includes corresponding stops 227, indicated individually by references 227a and 227b in FIG. 2A. The stops 227a and 227b on the base frame 210 of the daughter cart 200 function as "hard stops" which abut against the respective backstops 126a and 126b when the daughter cart 200 is mounted or loaded into the loading slot 160 of the base frame 110 in the mother cart 100.

As described above, the base frame 110 of the mother cart 100 is configured with the primary restraint mechanism 120 and also the secondary restraint mechanism 130. The primary restraint mechanism 120 is configured to secure the daughter cart 200 by engaging or locking the hoop or ring 216 (FIG. 2A) on the base frame 210. According to an embodiment, the primary restraint mechanism 120 comprises a latch or hook 170 which is configured to engage the hoop 216 and an actuator 172 for releasing the hook 170. The latch 170 is biased (e.g. utilizing a spring mechanism) in a closed or locking position so that hoop 216 is engaged when the daughter cart 200 is loaded or pushed into the loading bay or slot 160. The actuator 172 comprises a foot pad or lever which is depressed or push downwards by an operator to unlatch or unlock the hook 170 from the locking hoop 216, thereby allowing the operator to disengage or slide out the daughter cart 200 from the mother cart 100, for example, by pulling on the pull handles 212a, 212b.

The secondary restraint mechanism 130 is provided as a redundant or backup restraint mechanism to prevent unintentional release of the daughter cart 200 from the mother cart 100 in the event that the primary restraint mechanism 120 malfunctions, e.g. the hook 170 becomes disengaged from the locking hoop 216 on the daughter cart 200. According to an embodiment, the secondary restraint mechanism 130 comprises a locking bar 180 which is coupled to the base frame 110 of the mother cart 100 with a pivotable connector 182. The locking bar 180 is configured to swing or pivot between an open or unlocked position, indicated by reference 131 in FIG. 6B, and a closed or locked position, indicated by reference 133 in FIG. 6B. In the locked position 133, as shown in FIG. 1B, the locking bar 180 abuts against the base frame 210 (and the pull handle 212b) of the daughter cart 200, thereby preventing the daughter cart 200 from moving out of the loading bay or slot 160 and away from the mother cart 100, for example, if the primary restraint mechanism 120 has failed or become unlatched.

Figure 2D:
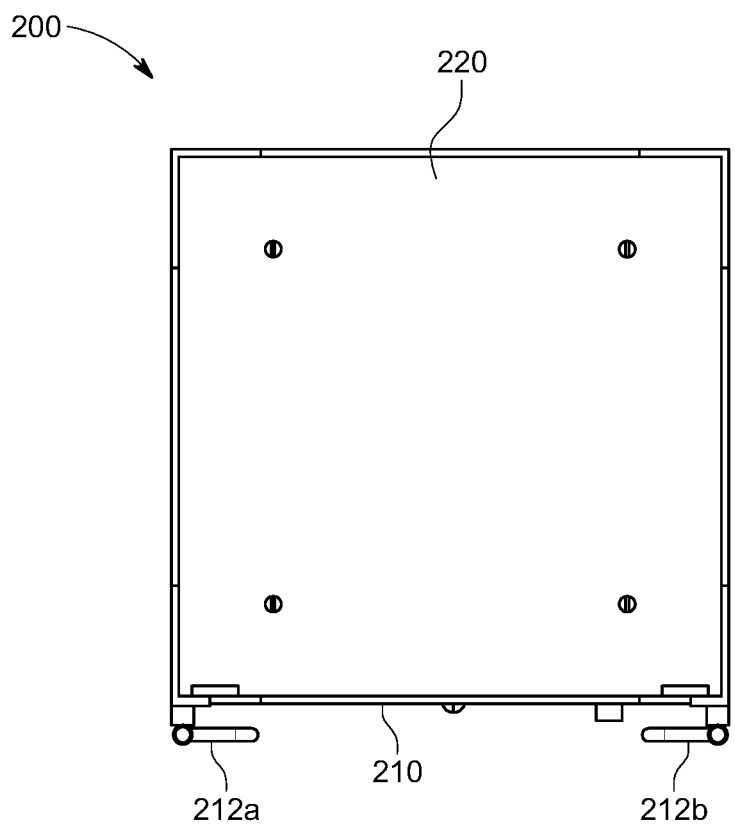
FIG. 2D shows a top view of the daughter cart of FIG. 2A.
Figure 2E:
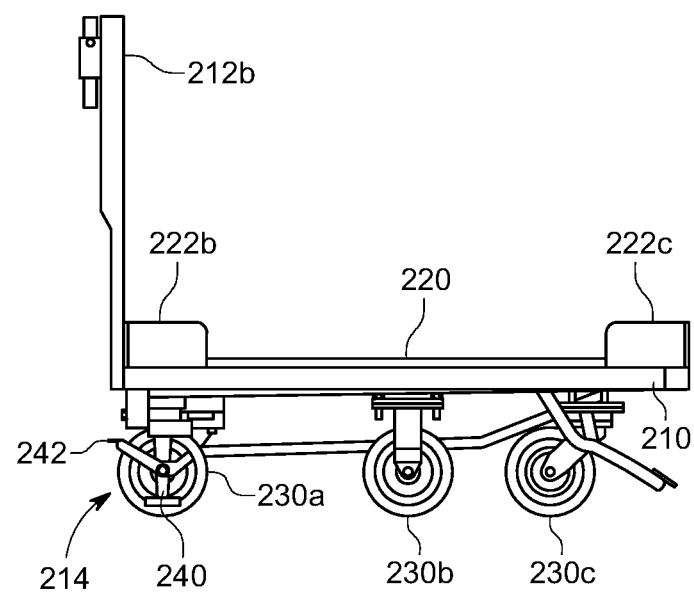
FIG. 2E shows a side view of the daughter cart of FIG. 2A.
Figure 3A:
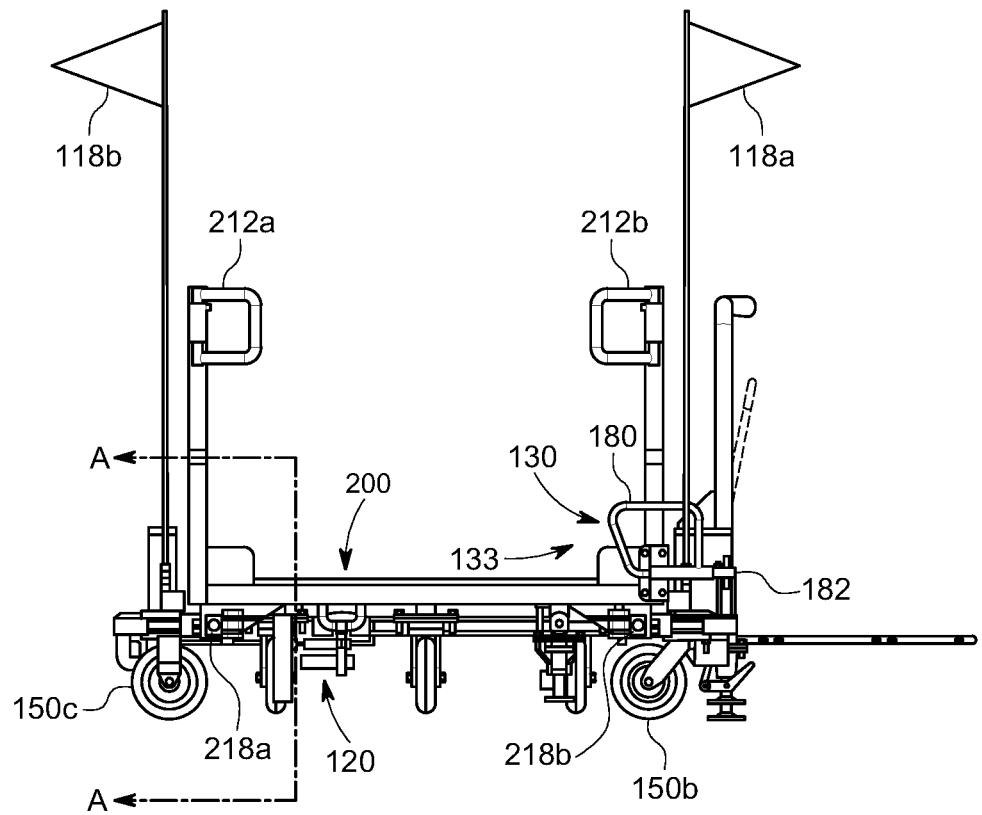
FIG. 3A shows a side view of the mother cart of FIG. 18 with the daughter or secondary cart in the engaged or loaded position.
Figure 3B:
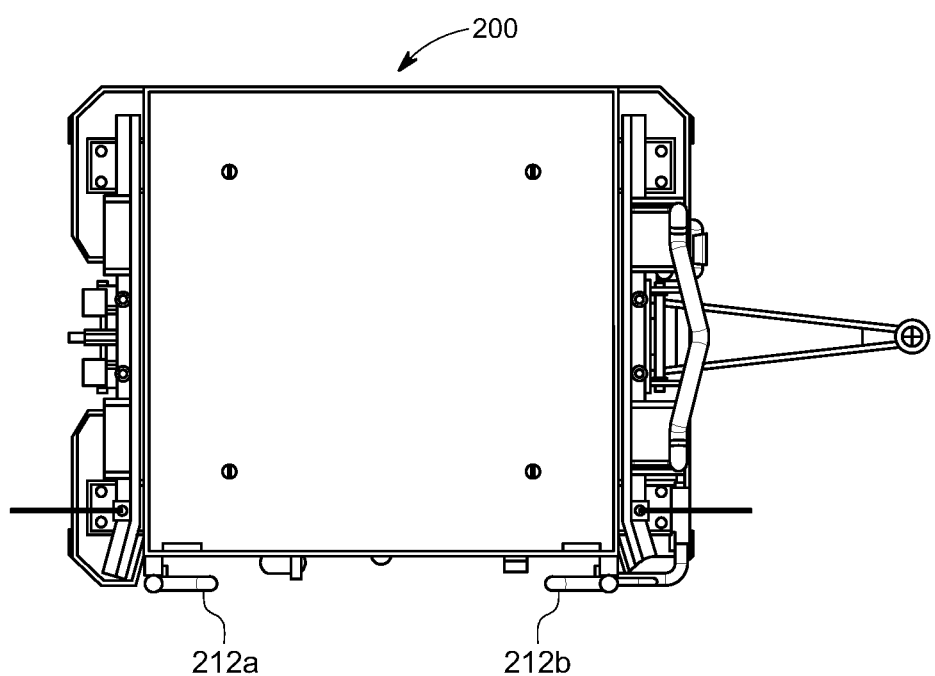
FIG. 3B is a top view of the mother cart and daughter cart of FIG. 3A.
Figure 3C:
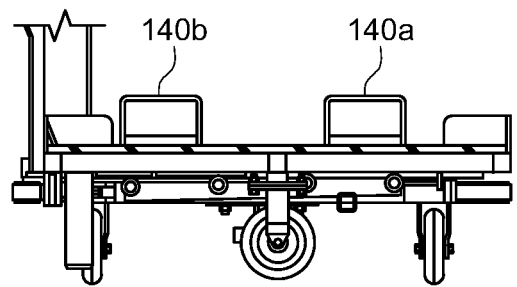
FIG. 3C is a side view of the base frame of the mother cart with the daughter cart in a loaded or engaged position and raised above the floor taken through section line A-A in FIG. 3A.
Figure 3D:
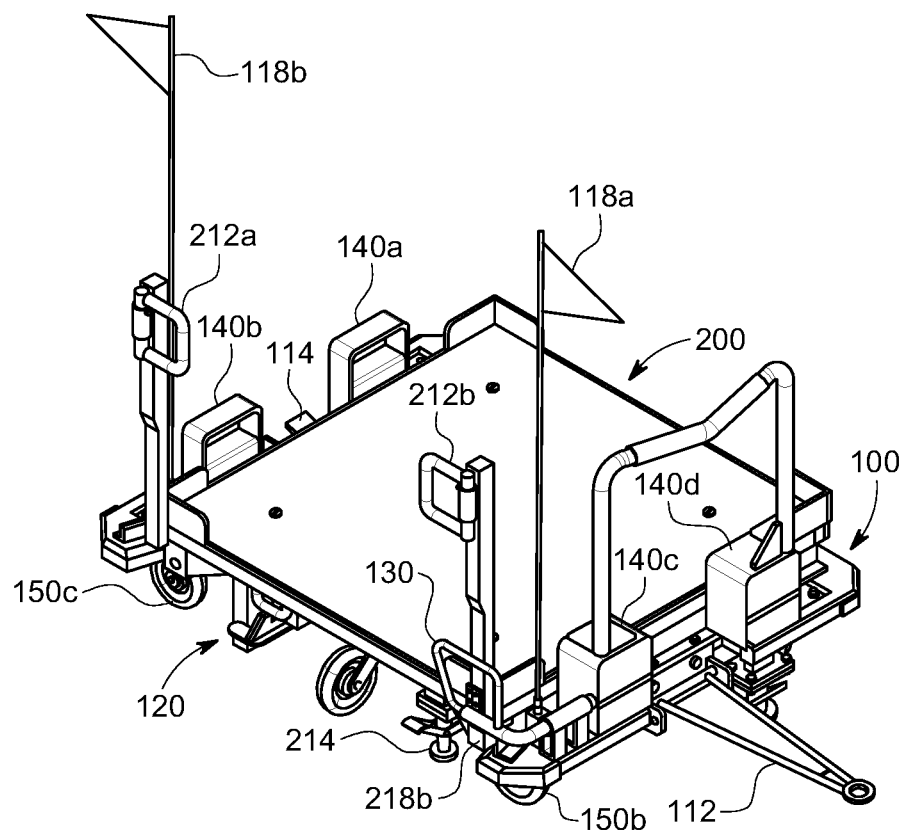
FIG. 3D shows a perspective view of the mother cart of FIG. 3A with the daughter or secondary cart in the engaged or loaded position.
Figure 5A:
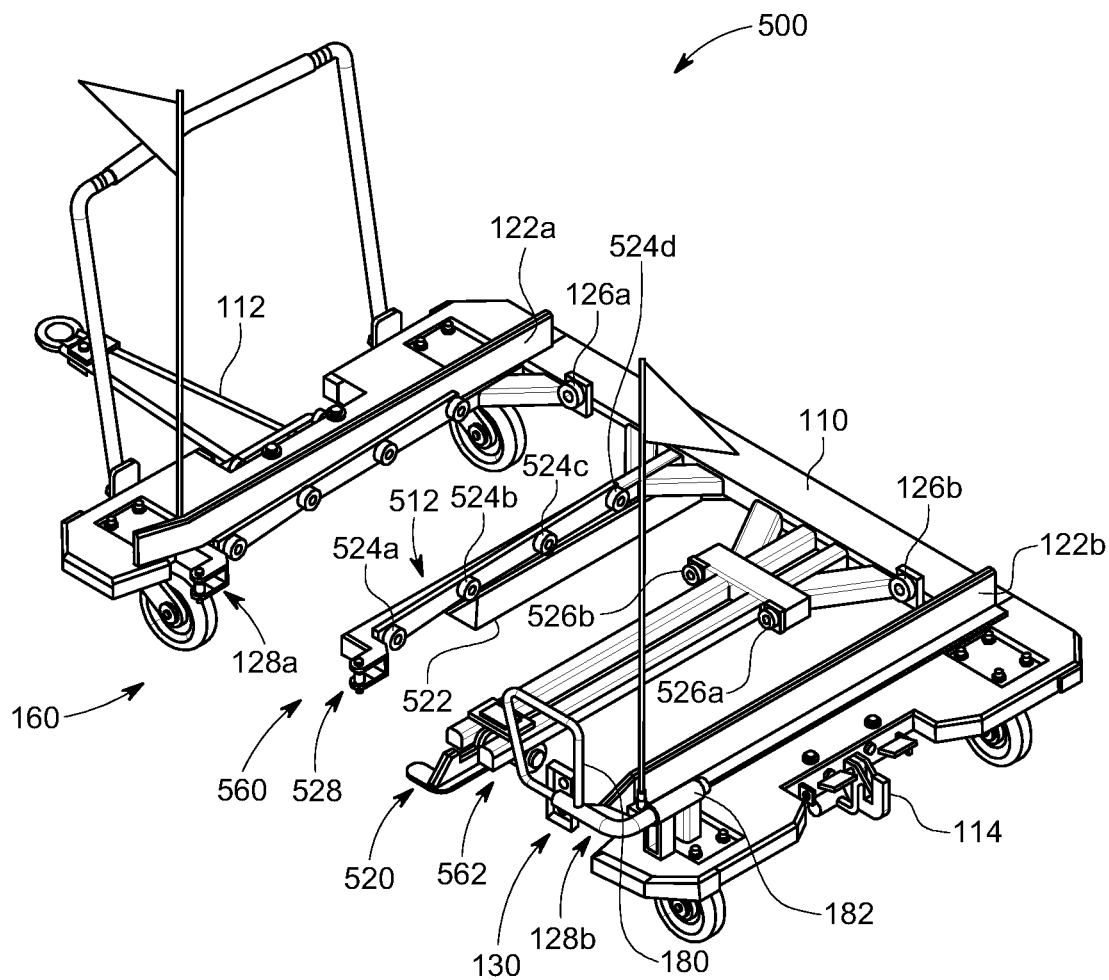
FIG. 5A shows in diagrammatic form a "left-hand" configured mother or primary cart according to another embodiment of the present invention.

Reference is next made to FIG. 5A, which shows a dual-configuration mother cart indicated generally by reference 500. The mother cart 500 is configured to load/carry a full size daughter cart 200 (FIG. 2), or a fractional, e.g. a three-quarter, size daughter cart as shown in FIGS. 9A to 9D and indicated generally by reference 900. The daughter cart 900 comprises a configuration similar to the daughter cart 200 of FIG. 2, with a smaller or reduced overall dimensions for the base frame 210 and the deck 220. For example, the deck 220 for the full-size daughter cart 200 is approximately 50"×50", as shown in FIG. 2D, and as shown in FIG. 9C, the three-quarter size daughter cart 900 has a deck 920 which measures approximately 34"×34".

As shown in FIG. 5A, the loading bay 160 for the dual-configuration mother cart 500 comprises a full-size loading slot indicated by reference 560 and a fractional, i.e. three-quarter, size loading slot indicated by reference 562. The three-quarter size slot 562 is configured with a structure similar to the loading slot 160 (FIG. 1A) and as shown comprises an intermediate support member 512 connected to the base frame 110, a primary restraint mechanism 520, the loading or guide plate 122b and the anti-splay slot 128b (and the roller configuration 129b as described above). The three-quarter loading slot 562 for the three-quarter daughter cart 900 is defined by the intermediate support member 512 at one end, and at the other end by the loading or guide plate 122b on the base frame 110 of the mother cart 500. The intermediate support member 512 is configured with a loading or guide plate 522, rollers 524 (indicated individually by references 524a, 524b, 524c and 524d as shown), and an anti-splay slot 528. As also shown, the loading slot 562 includes the primary restraint mechanism 520, which is configured in the same manner as the primary restraint mechanism 120, and comprises a latch or hook 570 and an actuator 572. The primary restraint mechanism 520 is configured to engage or secure a locking hoop 916 (FIG. 9A) on the base frame 210 of the three-quarter daughter cart 900, when the daughter cart 900 is loaded on the mother cart 500 as depicted in FIGS. 6A to 6C.

Figure 9A:
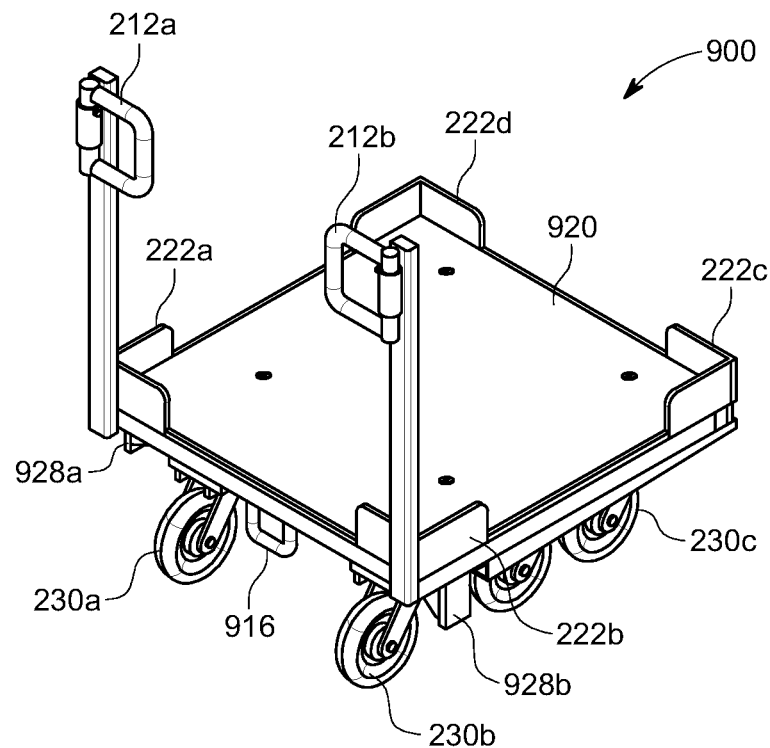
FIG. 9A shows a perspective view of a three-quarter or sectional daughter cart according to an embodiment of the present invention.
Figure 9B:
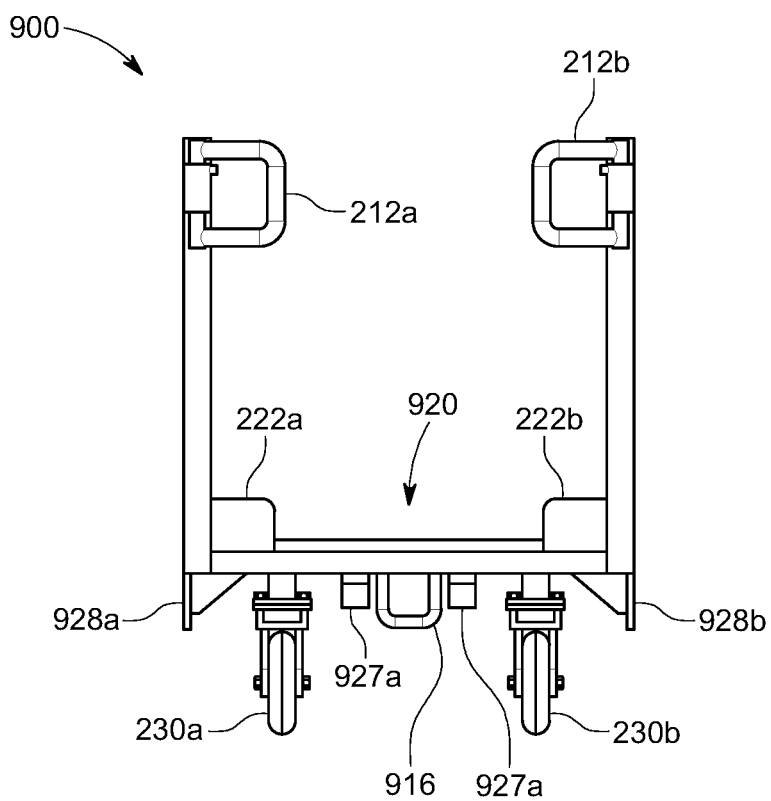
FIG. 9B shows a front view of the daughter cart of FIG. 9A.
Figure 9C:
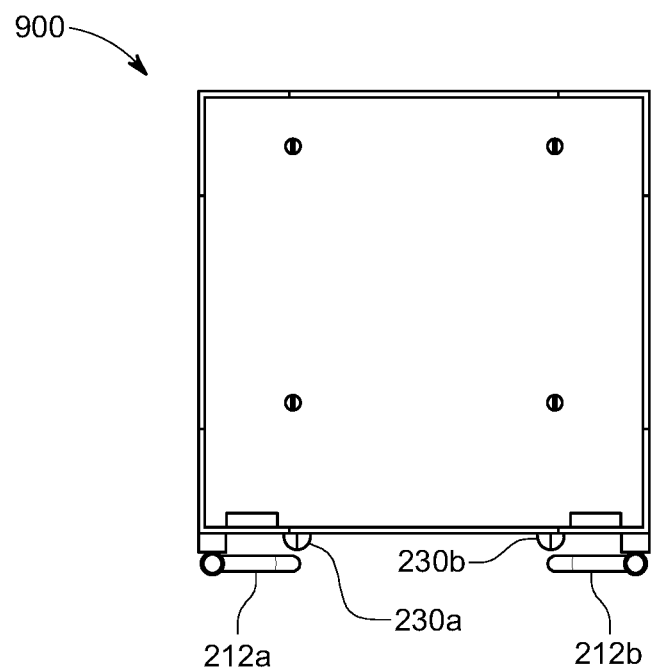
FIG. 9C shows a top view of the daughter cart of FIG. 9A.
Figure 9D:
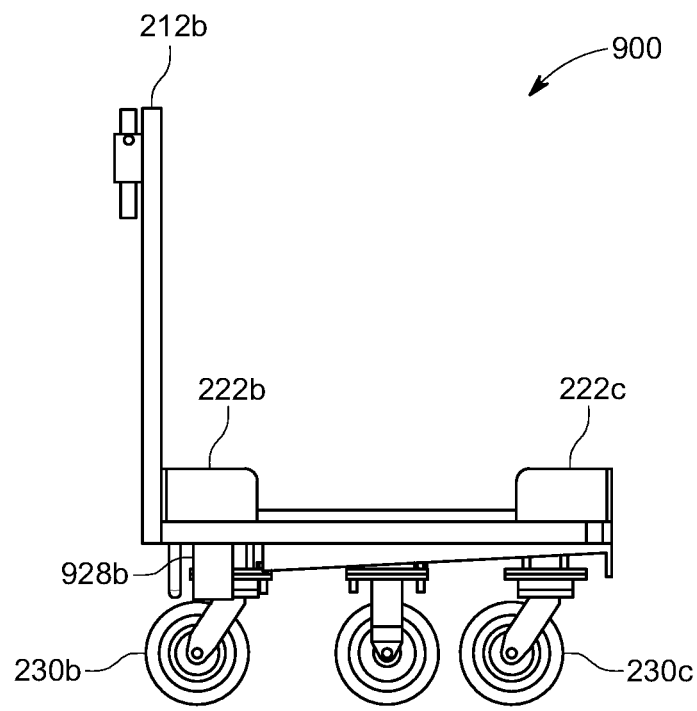
FIG. 9D shows a side view of the daughter cart of FIG. 9A.

According to another embodiment, the anti-splay mechanism comprises an anti-splay plate or flange 928 as shown in FIGS. 9A and 9B. The anti-splay plates 928, indicated individually by references 928a and 928b, are configured to engage the anti-splay slots 128a, 128b and anti-splay rollers 129a, 129b, for example, as depicted in FIG. 1A and described above. The anti-splay plates 928 may comprise, for example, a formed member in the frame of the daughter cart 900, or a plate that is attached, e.g. welded, to the frame of the daughter cart 900, and sized or configured for engaging the respective anti-splay slots 128. The particular implementation details will be readily apparent to one skilled in the art.

Figure 5B:
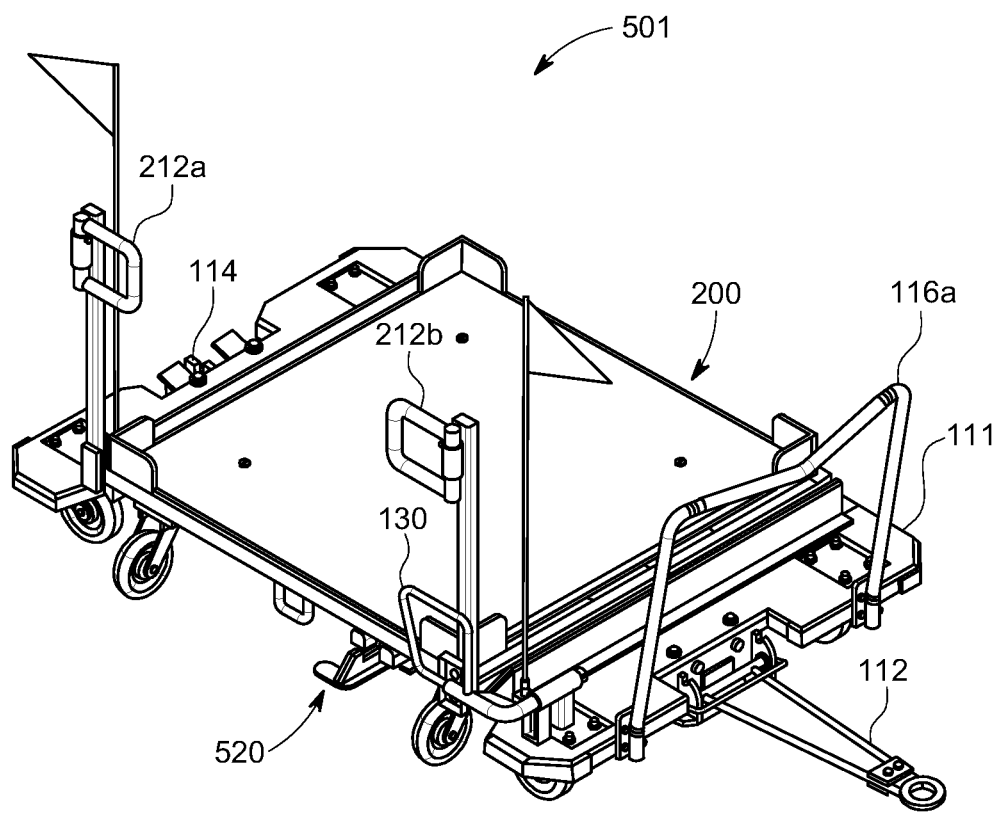
FIG. 5B shows a "right-hand" configured mother cart according to another embodiment of the present invention shown with a full daughter or secondary cart in the engaged or loaded position or configuration.

Referring back to FIG. 5A, the base frame 110 for the dual-configuration mother cart 500 comprises a "C-Frame" configuration and is configured for left-hand or left-side loading/unloading of the full size daughter cart 200 or the three-quarter size daughter cart 900. FIG. 5B shows, on the other hand, a dual-configuration mother cart 501 having a base frame 111 configured for right-hand or right-side loading/unloading of the full size daughter cart 200 as shown in FIG. 5B, or a three-quarter size daughter cart 900 as shown in FIGS. 6A to 6D. The dual-configuration mother cart 501 is also shown in FIGS. 7A to 7D, with a full size daughter cart 200 loaded in the full width loading bay or slot 560. As shown in FIG. 7D, the mother cart 501 is can be configured with a tilt angle, ranging from approximately 1° to 3°. As shown in FIG. 7B, the full-size daughter cart 200 is secured with the locking bar 130 in the closed or locking position 133.

Figure 6A:
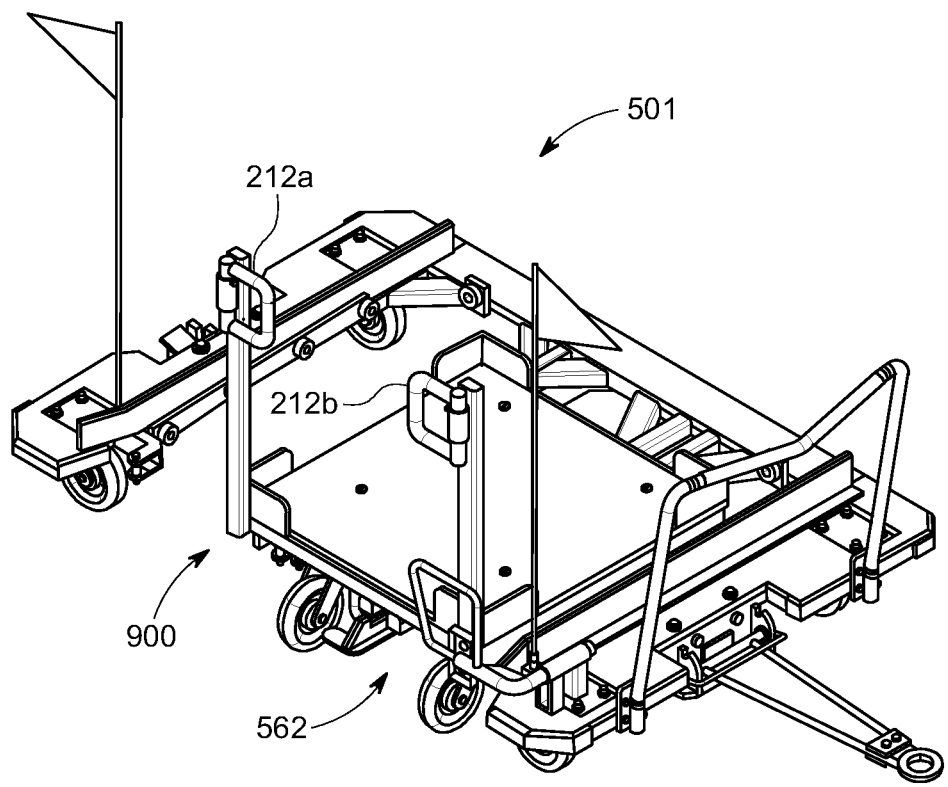
FIG. 6A shows the mother cart of FIG. 5B configured with a three-quarter or a sectional daughter cart according to an embodiment of the present invention.
Figure 6B:
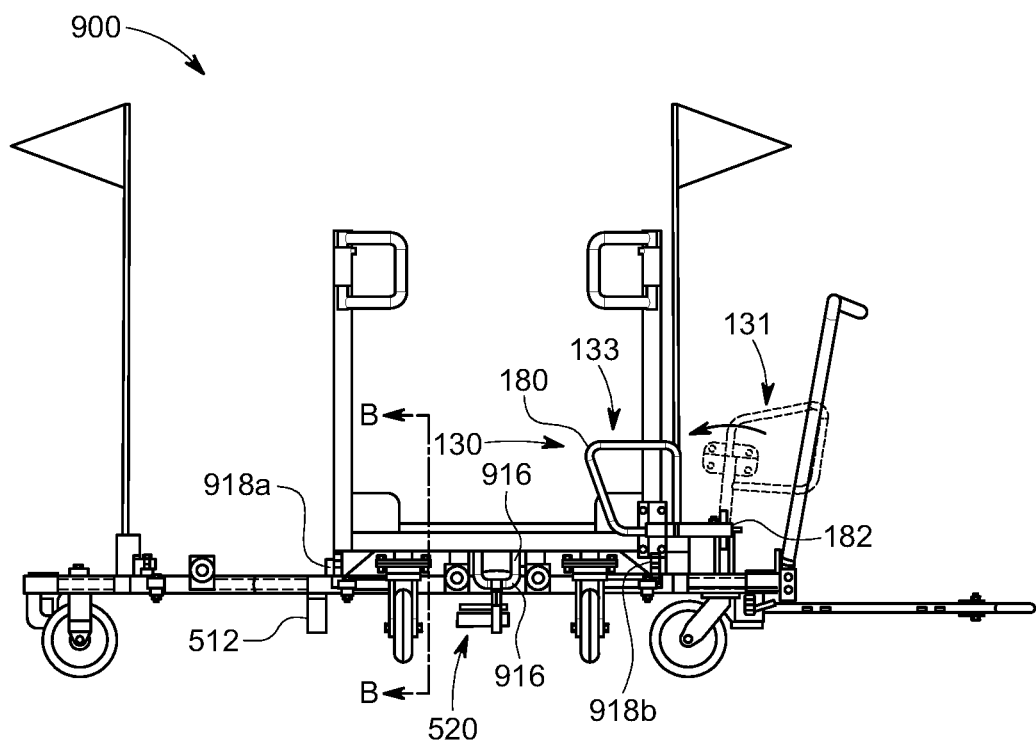
FIG. 6B shows a front view of the mother cart of FIG. 6A with the sectional daughter or secondary cart in the engaged or loaded position or configuration (i.e. raised or travel position)
Figure 6C:
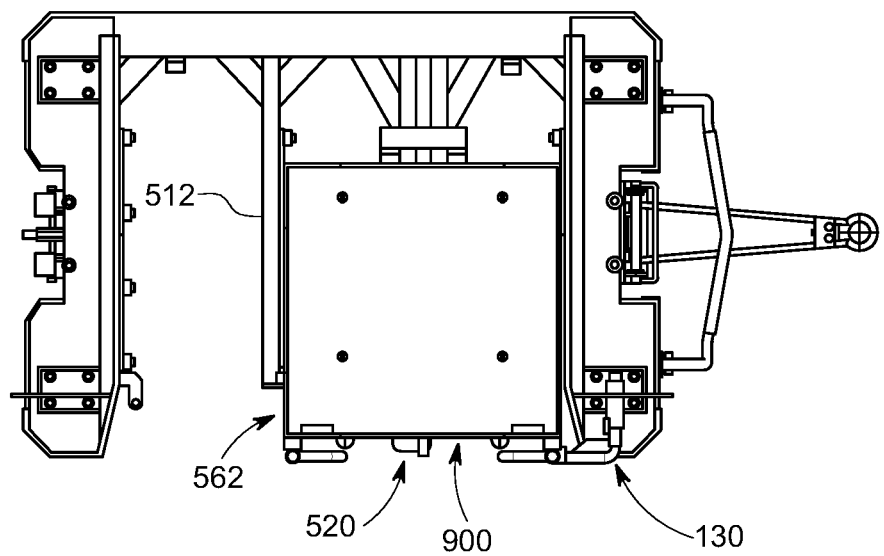
FIG. 6C shows a top view of the mother and daughter cart of FIG. 6A.
Figure 6D:
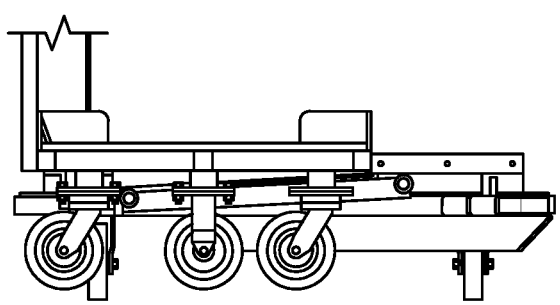
FIG. 6D shows a side view of the mother and daughter cart of FIG. 6A taken along section line B-B in FIG. 6B.
Figure 7A:
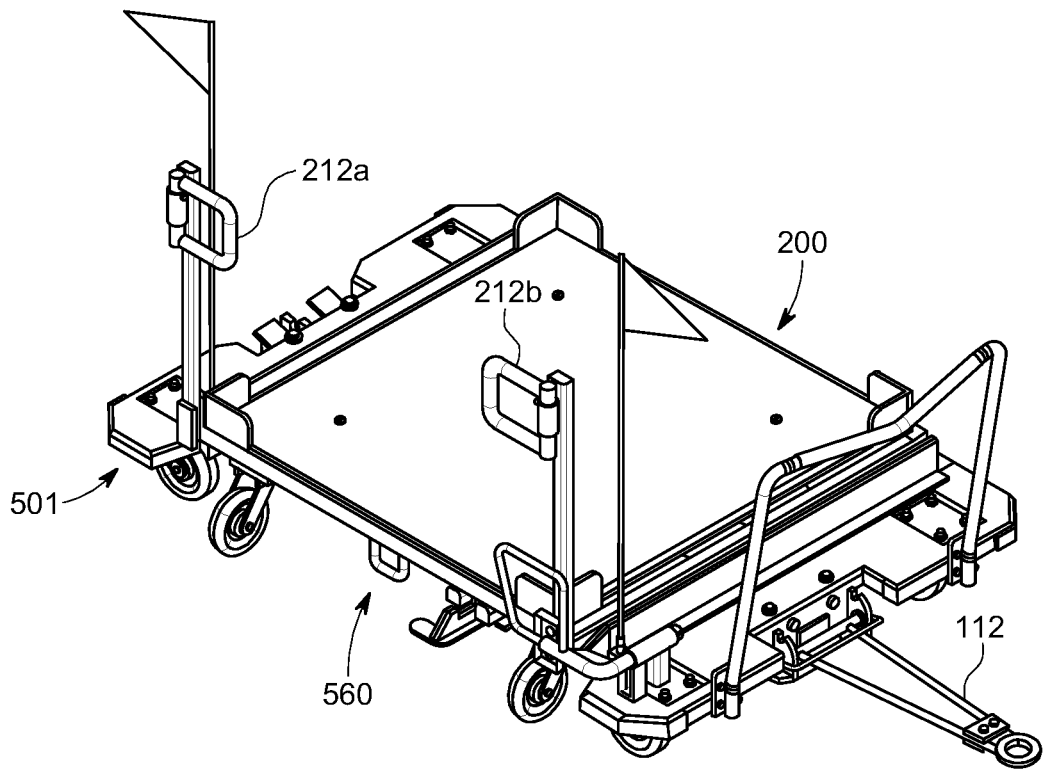
FIG. 7A shows the mother cart of FIG. 5A configured with a full daughter cart according to an embodiment of the present invention.
Figure 7B:
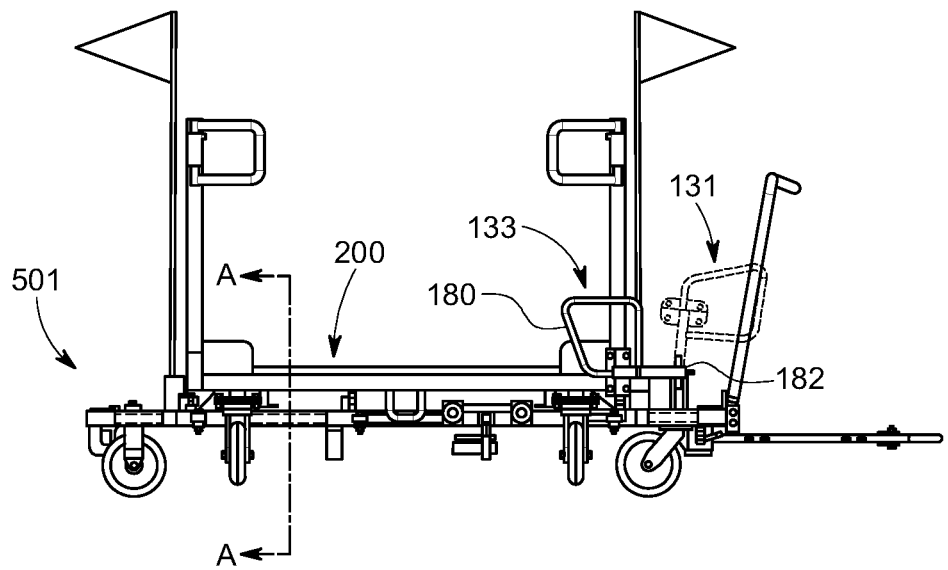
FIG. 7B shows a front view of the mother cart of FIG. 7A with the daughter or secondary cart in the engaged or loaded position or configuration (i.e. raised or travel position)
Figure 7C:
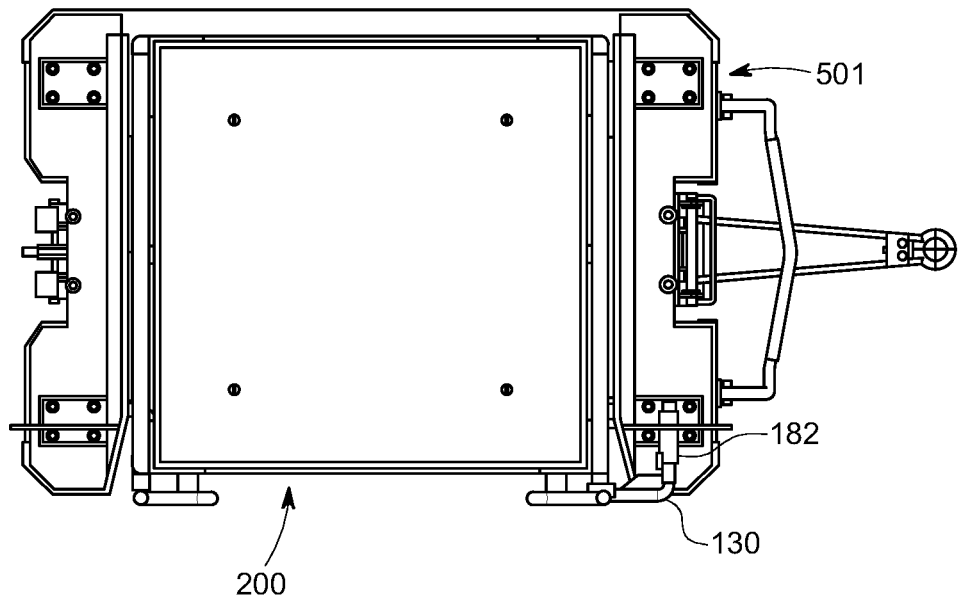
FIG. 7C shows a top view of the mother and daughter cart of FIG. 7A.
Figure 7D:
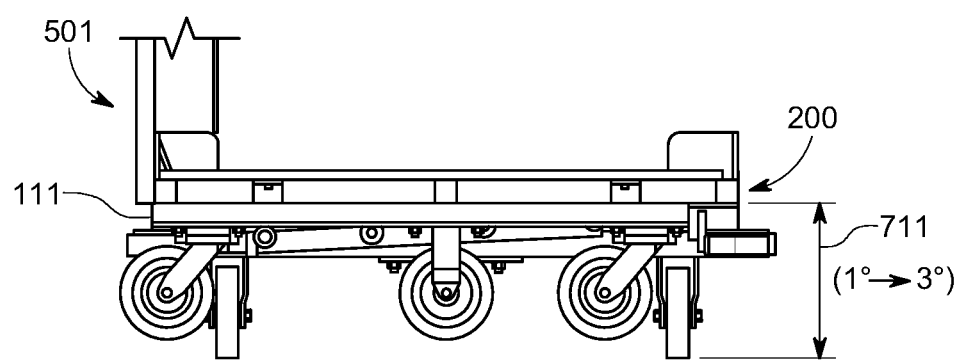
FIG. 7D shows a side view of the mother and daughter cart of FIG. 7A taken along section line A-A in FIG. 7B.

As shown in FIGS. 6A to 6D, a three-quarter daughter cart 900 is loaded onto the dual-configuration mother cart 501 in a similar manner. The three-quarter daughter cart 900 is positioned in front of and pushed into the three-quarter loading slot or bay 562 and abuts against backstops 526a and 526b, as depicted in FIGS. 6A and 6C. The three-quarter daughter cart 900 is secured into the loading position with the latch 570 on the primary restraint mechanism 520 engaging the locking hoop 916 on the base frame 910 of the daughter cart 900 as shown in FIG. 6B. The daughter cart 900 is also secured by the secondary restraint mechanism 130 with the locking bar 180 being moved from the unlocked position 131 to the locking position 133, as also shown in FIG. 6B. According to an embodiment, the three-quarter size daughter cart 900 is configured with anti-splay pins 918a and 918b (FIG. 6B) which are configured to engage the anti-splay slot 528 in the intermediate support member 512 and the anti-splay slot 128b in the base frame of the mother cart 501.

Referring again to FIG. 4, two or more mother carts 400 are coupled together to form a train or parts delivery system which is moved through an industrial plant or factory, e.g. an automotive assembly plant, by a tractor, engine other drive or propulsion system (not shown). The mother carts indicated individually by references 400a and 400b may comprise the single configuration mother cart 100 (FIG. 1) and daughter cart 200 (FIG. 2), and/or the dual-configuration mother cart 500 (FIG. 5) and the full daughter cart 200 (FIG. 2) or the three-quarter daughter cart 900 (FIGS. 9A to 9D), or a combination thereof. The mother carts 400 are coupled together through the tow-bar 112 and hitch 114 to form an industrial parts delivery system and train, for an assembly plant or other type of physical plant or factory application.

The present invention may be embodied in other specific forms without departing from the spirit or essential characteristics thereof. Certain adaptations and modifications of the invention will be obvious to those skilled in the art. Therefore, the presently discussed embodiments are considered to be illustrative and not restrictive, the scope of the invention being indicated by the appended claims rather than the foregoing description, and all changes which come within the meaning and range of equivalency of the claims are therefore intended to be embraced therein.

What is claimed is:

1. A mother cart suitable for transporting a daughter cart, said mother cart comprising:
    a base frame, said base frame comprising a substantially C-shape structure with an open side, and said open side defining a loading bay for receiving the daughter cart;
    said base frame including a support surface for supporting the daughter cart;
    said base frame having a primary restraint mechanism for engaging and securing the daughter cart in said loading bay; and
    said base frame further including one or more anti-splay receptacles, said anti-splay receptacles being configured for receiving a corresponding anti-splay member on the daughter cart so as to reduce splaying of the open side of said C-shape structure;
    said loading bay comprises a full width loading bay configured for a full width daughter cart, and a fractional width loading bay configured for a fractional width daughter cart;
    said fractional loading bay being formed inside said full width loading bay and comprising an intermediate support member connected to said base frame, said intermediate support member including an intermediate support surface for supporting a portion of the fractional width daughter cart, and said intermediate support member including an intermediate anti-splay receptacle configured for receiving a corresponding anti-splay member on said fractional width daughter cart so as to reduce splaying of said fractional loading bay; and
    wherein at least one of said anti-splay receptacles comprises a slot and a roller configured for guiding and receiving said corresponding anti-splay member as the daughter cart is loaded into said loading bay.

2. The mother cart as claimed in claim 1, wherein said fractional loading bay includes a primary restraint mechanism connected to said base frame, and being configured for securing the fractional width daughter cart in said fractional width loading bay.

3. The mother cart as claimed in claim 2, further including a second restraint mechanism, said second restraint mechanism being configured for mechanically securing the full width daughter cart in said full width loading bay or the fractional width daughter cart in said fractional width loading bay.

4. The mother cart as claimed in claim 3, wherein the open side for said C-shape structure is configured for right-side loading of the daughter cart onto said mother cart.

5. The mother cart as claimed in claim 3, wherein the open side for said C-shape structure is configured for left-side loading of the daughter cart onto said mother cart.

6. A mother cart suitable for transporting a daughter cart, said mother cart comprising:
- a base frame, said base frame comprising a substantially C-shape structure with an open side, and said open side defining a loading bay for receiving the daughter cart;
- said base frame including a support surface for supporting the daughter cart;
- said base frame having a primary restraint mechanism for engaging and securing the daughter cart in said loading bay; and
- said base frame further including one or more anti-splay receptacles, said anti-splay receptacles being configured for receiving a corresponding anti-splay member on the daughter cart so as to reduce splaying of the open side of said C-shape structure;
- said loading bay comprises a full width loading bay configured for a full width daughter cart, and a fractional width loading bay configured for a fractional width daughter cart;
- said fractional loading bay being formed inside said full width loading bay and comprising an intermediate support member connected to said base frame, said intermediate support member including an intermediate support surface for supporting a portion of the fractional width daughter cart, and said intermediate support member including an intermediate anti-splay receptacle configured for receiving a corresponding anti-splay member on said fractional width daughter cart so as to reduce splaying of said fractional loading bay; and
- wherein said intermediate anti-splay receptacle comprises a slot and a roller configured for guiding and receiving said corresponding anti-splay member as the fractional daughter cart is loaded into said fractional width loading bay.

7. The mother cart as claimed in claim 6, wherein said fractional loading bay includes a primary restraint mechanism connected to said base frame, and being configured for securing the fractional width daughter cart in said fractional width loading bay.

8. The mother cart as claimed in claim 7, further including a second restraint mechanism, said second restraint mechanism being configured for mechanically securing the full width daughter cart in said full width loading bay or the fractional width daughter cart in said fractional width loading bay.

9. The mother cart as claimed in claim 8, wherein the open side for said C-shape structure is configured for right-side loading of the daughter cart onto said mother cart.

10. The mother cart as claimed in claim 8, wherein the open side for said C-shape structure is configured for left-side loading of the daughter cart onto said mother cart.

* * * * *